Patented Oct. 25, 1949

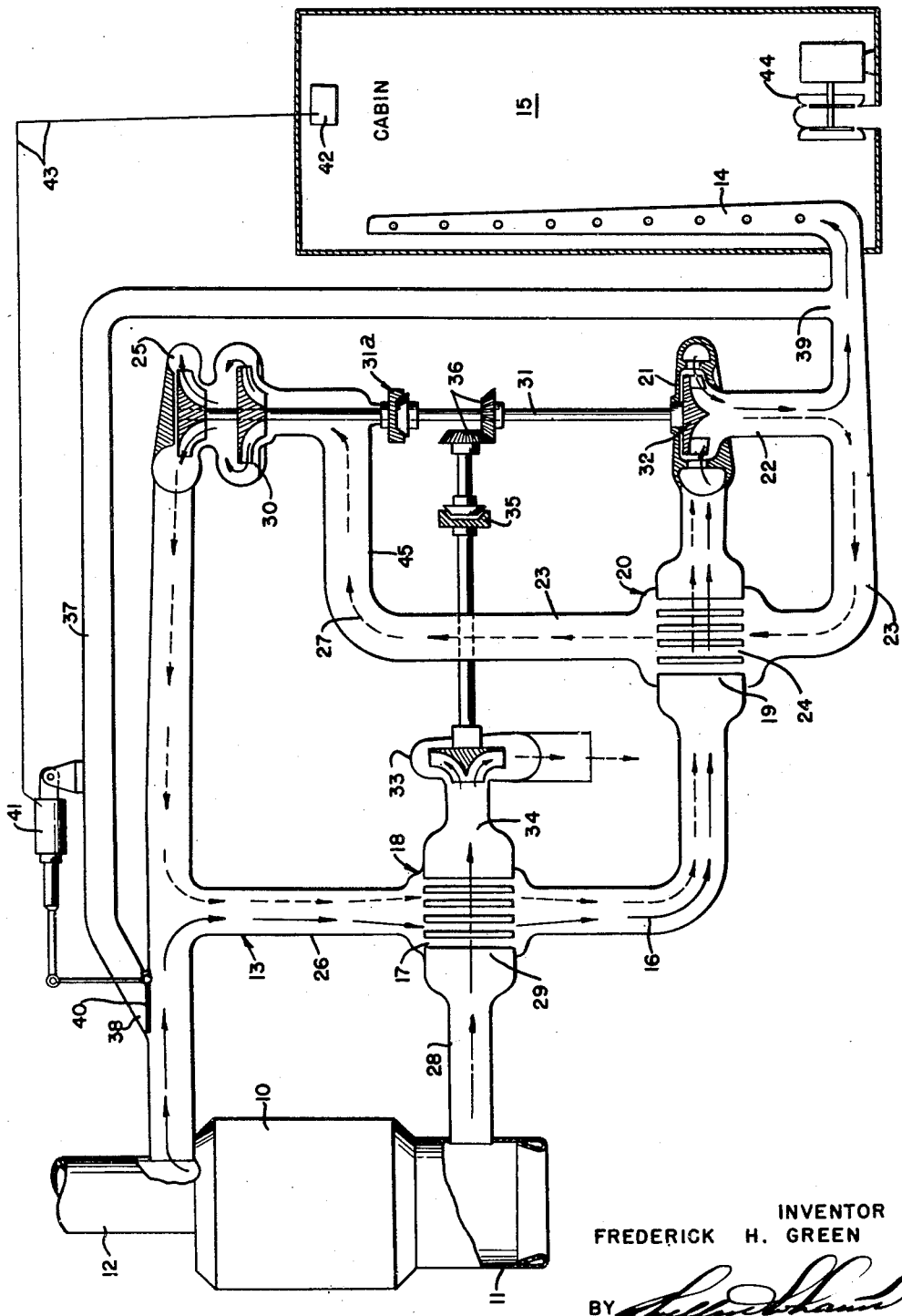

2,485,590

UNITED STATES PATENT OFFICE 2,485,590

COOLING SYSTEM FOR COMPARTMENTS USING EXPANSION ENGINE MEANS

Frederick H. Green, Los Angeles, Calif., assignor to The Garrett Corporation, Los Angeles, Calif., a corporation of California Application October 4, 1946, Serial No. 701,244

23 Claims. (Cl. 62—136)

My invention relates in general to cooling systems for aircraft and relates in particular to a cooling and ventilating system which, although of general utility, is especially suited for use in aircraft operated at high speeds and at high altitude.

It is an object of the invention to provide a cooling system for the atmosphere in an aircraft which is extremely simple and comparatively light in weight, yet is capable of efficiently reducing the temperature of that atmosphere to such degree that it may be employed in the compartments of high speed aircraft, such as those of the jet or rocket propelled type, wherein the temperature rise in the skin of the aircraft is very high, occasioned by its rapid passage through the atmosphere. For example, my present invention is of utility in aircraft having or exceeding the speed of 600 miles per hour, and wherein the temperature rise in the internal atmosphere of the aircraft due to ram acceleration and other effects such as radiation may be 65° F. or greater in the absence of cooling means.

It is an object of the invention to provide an aircraft cooling system wherein air or other gaseous fluid from a source thereof under pressure, such, for example, as a supercharger or the jet air compressor of a jet driven aircraft, or from a pressure flask or storage bottle, is carried through a primary path of flow to the cabin or other space to be cooled, this primary path of flow having therein the operating parts of a heat extraction engine which is driven by the gaseous fluid flow and which cools the fluid by the extraction of heat represented in the work done by the fluid in driving the operative parts of the work extraction engine, and in which system the work extracted from the primary flow of gaseous fluid is employed to motivate and/or compress a secondary flow of gaseous fluid which moves through a substantially closed circuit and which is carried in heat-exchange relation to the primary flow, thereby accomplishing an efficient cooling of the primary flow, which is conducted into the cabin, by utilizing a cooperative arrangement of parts wherein the loss of usable power is minimized.

It is a further object of the invention to provide a cooling system having gaseous fluid conducting means connecting a source of fluid under pressure with the cabin or other space, this fluid conducting means having therein means for cooling the flow comprising an expansion engine for the extraction of work as a part of its cooling function, in which system a portion of the gaseous fluid flowing in the conducting means is taken therefrom at a point downstream from the heat extraction engine and is returned to the conducting means at a point near its upstream end under a pressure substantially the equivalent of the pressure in the conducting means at the point of introduction, such pressure being produced by a compressor driven by work derived from the heat or work extraction engine. In the preferred form of the invention, described hereinafter, the diverted flow of cooled fluid is conducted in heat transfer relationship with the fluid flowing in the primary flow conducting means for the purpose of extracting heat therefrom.

A further object of the invention is to provide a cooling system as described herein, having means for utilizing power derived from the work extraction engine for causing circulation of coolant during prescribed periods of operation of the system.

Further objects and advantages of the invention will be brought out in the following part of the specification, wherein the explanation of specific structure is for the purpose of fully disclosing embodiments of the invention without placing limitation on the scope thereof set forth in the appended claims.

Referring to the drawing which comprises a schematic view of a preferred form of my invention as applied to a jet driven aircraft having a cabin containing an air atmosphere, I have shown a source 10 of air under pressure. Where the invention is employed in a jet driven craft, this source 10 may consist of the jet compressor of the aircraft which receives air through a ram duct or inlet 11 and delivers compressed air through a jet duct 12 connected to the jet structure of the aircraft, which forms no part of the present invention and therefore is not disclosed. The invention provides air conducting means 13 through which air under pressure is carried from the outlet of the source 10 to an air distributing duct 14 in an aircraft cabin 15, as indicated by the full-line arrows 16. The air conducting means 13 includes the cooling passages 17 of a primary heat exchanger 18, the cooling passages 19 of a secondary heat exchanger 20, and the internal passages of a heat extraction engine 21 which is shown as an air driven turbine.

A portion of the air which leaves the outlet 22 of the turbine 21 is carried by air conducting means 23 back into the air conducting means 13 at a point ahead of our upstream from the primary heat exchanger 18. This secondary air conducting means 23 includes the coolant passages 24 of the secondary heat exchanger 20 and an air compressor 25 shown as a two-stage centrifugal compressor capable of bringing the air which is diverted through the air conducting means 23 to a pressure at least as great as the air pressure in the duct 26 which leads from the source 10 to the heat exchanger 18. The secondary flow of air which is moved through the air conducting means 23 is indicated by broken-line arrows 27. It will be perceived that these arrows 27 follow a path which is a continuous circuit within the air conducting means 23 and selected portions of the air conducting means 13, from the outlet 22 of the turbine 21, through the coolant passages 24 of the heat exchanger 20, through the duct portion 45 of the air conducting means 23, through the internal passages of the air compressor 25, through the duct 26, through the cooling passages 17 of the heat exchanger 18, through the cooling passages 19 of the heat exchanger 20, and then through the internal spaces of the turbine 21 to the outlet 22 thereof.

The arrows 16 and 27 indicate two separate streams of air. These streams of air are brought together and comingle in the duct 26 of the air conducting means 13, and in this comingled relation pass through the heat exchangers 18 and 20 and the turbine 21. At the outlet 22 of turbine 21 an amount of air, equal to that added to and comingling with the air inducted from the outlet of the source 10, is extracted to be returned to the duct 26. Air to serve as a coolant in the heat exchanger 18 is inducted from the inlet 11 through an air duct 28 which is connected to the heat exchanger 18 in such manner that the coolant air will be directed through the coolant passages 29 of the heat exchanger 18 in heat transfer relationship with the air flowing through the cooling passages 17 thereof. The coolant air is then directed from coolant outlet 34 into air pump 33, and then ultimately rejected into the atmosphere. Power for driving the impellers 30 of the air compressor 25 is derived from the work extracted from the air flowing through the turbine 21, through shafting 31 which connects the impellers 30 of the compressor 25 with the rotor 32 of the turbine 21.

I have shown an air pump 33 of centrifugal type connected to the coolant outlet 34 of the heat exchanger 18 and driven through a clutch 35 and gears 36 from the shaft 31, but it will be understood that this air pump 33 need not be used under all conditions, but in selected uses of the invention, and when the output of the turbine is sufficient, provides a means for moving coolant air through the heat exchanger 18 when there is insufficient available air pressure in the duct 28 as, for example, when the aircraft is standing on a field with source 10 idling prior to takeoff of the aircraft. Also, the shafting 31 includes a clutch 31a which is normally engaged while the aircraft is in flight. The clutch 31a provides a means for disconnecting the turbine rotor 32 from the impellers of the compressor 25, when the aircraft is idling prior to a takeoff, so that all of the power made available by the turbine 21 may be utilized in driving the pump 33.

A bypass duct 37, for carrying uncooled air to the aircraft cabin 15, is shown with its inlet and outlet ends 38 and 39 connected to the air conducting means 13 respectively at points near the upstream and downstream ends thereof. This bypass duct 37 is provided with a bypass valve 40 arranged to be operated by an actuator 41 under control of thermostatic means 42 situated in the aircraft cabin 15, the interconnection of the parts 41 and 42 being indicated schematically by a line 43. The cabin 15 is provided with an air outlet valve 44 which may be of the type shown in the application of James M. Kemper, Serial No. 556,790, filed October 2, 1944, now Patent No. 2,463,491, granted March 1, 1949, whereby pressure may be maintained in the cabin 15 if desired. It will be understood that herein the term "cabin" includes any space or compartment of the aircraft which receives gaseous fluid cooled by the system, and that the term "aircraft" places no limitation upon the wide usefulness of the invention, since it can be employed in conjunction with rockets and other types of "aircraft" which travel through the air but are not necessarily airborne.

In the operation of the invention, low temperature is achieved in the air delivered to the cabin 15 with a high degree of efficiency, by reason of the simple and cooperative arrangement of the primary and secondary air conducting means so as to utilize the work extracted by the turbine 21 to produce an additive cooling effect. A portion of the power represented by the heat extracted from the air in the turbine 21 may, when available, be used to motivate the secondary or supplementary air-cooling and/or heat extracting air stream. Among the important advantages obtained by the invention are that low temperatures in the air to the cabin are obtained, comparable to those available from the regenerative system shown in copending application, Serial No. 649,932, filed February 25, 1946, by Wood and Alexander; that a slightly higher turbine pressure ratio than that of the above mentioned regenerative system is obtained due to decreased back pressure; that the secondary heat exchanger may be smaller than that required by the regenerative system; the ambient air coolant flow is minimized; and the efficiency of the system rises sharply with increase of aircraft speed, particularly in the supersonic speed range.

I claim as my invention:

1. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; and recirculating means for returning to said path of flow ahead of said engine a portion of the cooled gaseous fluid which has passed through said engine, said recirculating means including pumping means driven by said engine for compressing the recirculating gaseous fluid so that it will pass back into said path of flow.

2. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; and recirculating means for returning to said path of flow ahead of said engine and said heat exchange means a portion of the cooled gaseous fluid which has passed through said engine, said recirculating means including pumping means driven by said engine for compressing the recirculating gaseous fluid so that it will pass back into said path of flow.

3. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; recirculating means for returning to said path of flow ahead of said engine a portion of the cooled gaseous fluid which has passed through said engine, said recirculating means including pumping means driven by said engine for compressing the recirculating gaseous fluid so that it will pass back into said path of flow; and pumping means driven by said engine for causing movement of said coolant through said coolant passes of said heat exchange means.

4. In a mechanism for use in a system, employing heat exchange means for cooling the atmosphere of a compartment from a source of gaseous fluid, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; recirculating means for returning to said path of flow ahead of said engine and said heat exchange means a portion of the cooled gaseous fluid which has passed through said engine, said recirculating means including pumping means driven by said engine for compressing the recirculating gaseous fluid so that it will pass back into said path of flow; and pumping means driven by said engine for causing movement of said coolant through said coolant passes of said heat exchange means.

5. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; and recirculating means for returning to said path of flow ahead of said engine a portion of the cooled gaseous fluid which has passed through said engine, said recirculating means including means for passing said portion of the cooled gaseous fluid in heat exchange relation to the gaseous fluid in said path of flow and pumping means driven by said engine for compressing the recirculating gaseous fluid so that it will pass back into said path of flow.

6. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; and recirculating means for returning to said path of flow ahead of said engine and said heat exchange means a portion of the cooled gaseous fluid which has passed through said engine, said recirculating means including means for passing said portion of cooled gaseous fluid in heat exchange relation to the gaseous fluid in said path of flow and pumping means driven by said engine for compressing the recirculating gaseous fluid so that it will pass back into said path of flow.

7. In a mechanism for use in a system, employing first and second heat exchange means for cooling the atmosphere of a compartment from a source of gaseous fluid under pressure, the combination of: means forming a path of flow of gaseous fluid from said source to said compartment, said means including the cooling passes of said first and second heat exchange means and a gaseous fluid driven work extraction engine; means for directing a coolant through the coolant passes of said first heat exchange means; and recirculating means for returning to said path of flow ahead of said engine a portion of the cooled gaseous fluid which has passed through said engine, said recirculating means including the coolant passes of said second heat exchange means and pumping means driven by said engine for compressing the recirculating gaseous fluid so that it will pass back into said path of flow.

8. In a mechanism for use in a system, employing first and second heat exchange means for cooling the atmosphere of a compartment from a source of gaseous fluid under pressure, the combination of: mean forming a path of flow of gaseous fluid from said source to said compartment, said means including the cooling passes of said first and second heat exchange means and a gaseous fluid driven work extraction engine; means for directing a coolant through the coolant passes of said first heat exchange means; and recirculating means for returning to said path of flow ahead of said engine and said first heat exchange means a portion of the cooled gaseous fluid which has passed through said engine, said recirculating means including the coolant passes of said second heat exchange means and pumping means driven by said engine for compressing the recirculating gaseous fluid so that it will pass back into said path of flow.

9. In a mechanism for use in a system, employing first and second heat exchange means for cooling the atmosphere of a compartment from a source of gaseous fluid under pressure, the combination of: means forming a path of flow of gaseous fluid from said source to said compartment, said means including cooling passes of said first and second heat exchange means and a gaseous fluid driven work extraction engine; means for directing a coolant through the coolant passes of said first heat exchange means; recirculating means for returning to said path of flow ahead of said engine a portion of the cooled gaseous fluid which has passed through said engine, said recirculating means including the coolant passes of said second heat exchange means and pumping means driven by said engine for compressing the recirculating gaseous fluid so that it will pass back into said path of flow; and pumping means driven by said engine for causing movement of said coolant through said coolant passes of said first heat exchange means.

10. In a mechanism for use in a system, employing first and second heat exchange means for cooling the atmosphere of a compartment from a source of gaseous fluid under pressure, the combination of: means forming a path of flow of gaseous fluid from said source to said compartment, said means including cooling passes of said first and second heat exchange means and a gaseous fluid driven work extraction engine; means for directing a coolant through the coolant passes of said first heat exchange means; recirculating means for returning to said path of flow ahead of said engine and said first heat exchange means a portion of the cooled gaseous fluid which has passed through said engine, said recirculating means including pumping means driven by said engine for compressing the recirculating gaseous fluid so that it will pass back into said path of flow; and pumping means driven by said engine for causing movement of said coolant through said coolant passes of said first heat exchange means.

11. In a mechanism for use in a system for cooling the atmosphere of a compartment from a source of gaseous fluid under pressure, the combination of: means forming first and second paths of flow for gaseous fluid, each including work extraction means and having cooling means for cooling the flow of gaseous fluid therein before it passes through the work extraction means thereof, said first path of flow connecting said source of gaseous fluid under pressure with said compartment and said second path of flow forming a continuous circuit; compressing means driven by power derived from said work extraction means for moving gaseous fluid in said second path of flow through the cooling means thereof; and means for passing the cooled gaseous fluid flowing in said second path of flow in heat exchange relation to the gaseous fluid flowing in said first path of flow.

12. In a mechanism for use in a system for cooling the atmosphere of a compartment from a source of gaseous fluid under pressure, the combination of: means forming first and second paths of flow for gaseous fluid, each including work extraction means and having cooling means for cooling the flow of gaseous fluid therein before it passes through the work extraction means thereof, said first path of flow connecting said source of gaseous fluid under pressure with said compartment; compressing means driven by power derived from said work extraction means for moving gaseous fluid in said second path of flow through the cooling means thereof; and means for passing the cooled gaseous fluid flowing in said second path of flow in heat exchange relation to the gaseous fluid flowing in said first path of flow at a point in said first path of flow ahead of the work extraction means therein.

13. In a mechanism for use in a system for cooling the atmosphere of a compartment from a source of gaseous fluid under pressure, the combination of: means forming first and second paths of flow for gaseous fluid, each including work extraction means and having cooling means for cooling the flow of gaseous fluid therein before it passes through the work extraction means thereof, said first path of flow connecting said source of gaseous fluid under pressure with said compartment and said second path of flow forming a continuous circuit; compressing means driven by power derived from said work extraction means for moving gaseous fluid in said second path of flow through the cooling means thereof; and means for passing the cooled gaseous fluid from the work extraction means of said second path of flow in heat exchange relation to the flow of gaseous fluid in said first path of flow ahead of the work extraction means therein.

14. In a mechanism for use in a system for cooling the atmosphere of a compartment from a source of gaseous fluid under pressure, the combination of: first gaseous fluid conducting means connecting said source with said compartment, having therein cooling means comprising work extraction means; a second gaseous fluid conducting means forming a continuous circuit having cooling means therein; gaseous fluid compressing means driven by power derived from said work extraction means for moving gaseous fluid in said second gaseous fluid conducting means through the continuous circuit thereby formed; means operated by power derived from said work extraction means for precooling the gaseous fluid in said first gaseous fluid conducting means ahead of said work extraction means; and means for directing the cooled gaseous fluid in said second gaseous fluid conducting means in heat exchange relationship with the gaseous fluid in said first conducting means.

15. In a mechanism for use in a system, employing heat exchange means for cooling the atmosphere of a compartment from a source of gaseous fluid under pressure, the combination of: means forming a path of flow of gaseous fluid from said source to said compartment, said means including the cooling passes of said heat exchange means and a gaseous fluid driven work extraction engine; means for directing a coolant through the coolant passes of said heat exchange means; recirculating means for returning to said path of flow ahead of said engine a portion of the cooled gaseous fluid which has passed through said engine, said recirculating means including pumping means driven by said engine for compressing the recirculating gaseous fluid so that it will pass back into said path of flow; pumping means drivable by said engine for causing movement of said coolant through said coolant passes of said heat exchange means; and means for disconnecting said first named pumping means from said engine.

16. In a mechanism for use in a system for cooling the atmosphere of a compartment from a source of gaseous fluid under pressure, the combination of: means forming first and second paths of flow for gaseous fluid, each including work extraction means and having power driven cooling means for cooling the flow of gaseous fluid therein before it passes through the work extraction means thereof, said first path of flow connecting said source of gaseous fluid under pressure with said compartment and said second path of flow forming a continuous circuit; compressing means for moving gaseous fluid in said second path of flow through the cooling means thereof; means for passing the cooled gaseous fluid from the work extraction means of said second path of flow in heat exchange relation to the flow of gaseous fluid in said first path of flow ahead of the work extraction means therein; and power transmission means for driving said cooling means and said compressing means from said work extraction means.

17. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; recirculating means for returning to said path of flow ahead of said engine a portion of the cooled gaseous fluid which has passed through said engine, said recirculating means comprising duct means connecting the outlet of said engine with said path of flow ahead of said engine; and pumping means driven by said engine for causing movement of said coolant through said coolant passes of said heat exchange means.

18. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; and recirculating means for returning to said path of flow ahead of said engine a portion of the cooled gaseous fluid which has passed through said engine, said recirculating means comprising duct means connecting the outlet of said engine with said path of flow between said engine and said source and means connected to said duct means independently of said engine and operating to move fluid through said duct means.

19. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; recirculating means for returning to said path of flow ahead of said engine and said heat exchange means a portion of the cooled gaseous fluid which has passed through said engine, said recirculating means comprising duct means connecting the outlet of said engine with said path of flow ahead of said engine; and pumping means driven by said engine for causing movement of said coolant through said coolant passes of said heat exchange means.

20. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; and recirculating means for reducing the temperature of the air delivered to said compartment by returning to said path of flow ahead of said engine and said heat exchange means a portion of the cooled gaseous fluid which has passed through said engine, said recirculating means comprising duct means independent of said compartment and connecting the outlet of said engine with said path of flow ahead of said engine so as to deliver substantially all of said portion to the flow of gaseous fluid which is moving through said path of flow to the inlet of said engine.

21. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; recirculating means for returning to said path of flow ahead of said engine a portion of the cooled gaseous fluid which has passed through said engine, said recirculating means comprising duct means connecting the outlet of said engine with said path of flow ahead of said engine; and means for passing a portion of the cooled gaseous fluid in heat exchange relation to the gaseous fluid in said path of flow.

22. In a mechanism for use in a system, employing heat exchange means for cooling the atmosphere of a compartment, the combination of: means forming a path of flow of gaseous fluid leading to said compartment, said path of flow including a source of gaseous fluid under pressure, the cooling passes of said heat exchange means and a gaseous fluid driven work extraction engine; means for directing a coolant through the coolant passes of said heat exchange means; recirculating means for returning to said path of flow ahead of said engine and said heat exchange means a portion of the cooled gaseous fluid which has passed through said engine, said recirculating means comprising duct means connecting the outlet of said engine with said path of flow ahead of said engine; and means for passing a portion of the cooled gaseous fluid in heat exchange relation to the gaseous fluid in said path of flow.

23. In a mechanism for use in a system, employing first and second heat exchange means for cooling the atmosphere of a compartment, the combination of: means forming a path of flow of gaseous fluid leading to said compartment, said path of flow including a source of gaseous fluid under pressure, cooling passes of said first and second heat exchange means and a gaseous fluid driven work extraction engine; means for directing a coolant through the coolant passes of said first heat exchange means; recirculating means for returning to said path of flow ahead of said engine and said first heat exchange means a portion of the cooled gaseous fluid which has passed through said engine, said recirculating means comprising duct means for conducting a portion of the cooled gaseous fluid through the coolant passes of said second heat exchange means and into said path of flow ahead of said second heat exchange means; and pumping means driven by said engine for causing movement of said coolant through said coolant passes of said first heat exchange means.

FREDERICK H. GREEN.

No references cited.